(12) United States Patent
Makino et al.

(10) Patent No.: US 10,745,264 B2
(45) Date of Patent: Aug. 18, 2020

(54) BEVERAGE SUPPLYING DEVICE

(71) Applicant: Panasonic Intellectual Property Management Co., Ltd., Osaka (JP)

(72) Inventors: Atsushi Makino, Saitama (JP); Akira Goitsuka, Saitama (JP); Fumihiro Takahashi, Tochigi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 150 days.

(21) Appl. No.: 15/522,446

(22) PCT Filed: Oct. 27, 2015

(86) PCT No.: PCT/JP2015/005398
§ 371 (c)(1),
(2) Date: Apr. 27, 2017

(87) PCT Pub. No.: WO2016/067602
PCT Pub. Date: May 6, 2016

(65) Prior Publication Data
US 2017/0355586 A1   Dec. 14, 2017

(30) Foreign Application Priority Data
Oct. 31, 2014  (JP) .................................. 2014-223632

(51) Int. Cl.
*B67D 1/08* (2006.01)
*G07F 13/00* (2006.01)
(Continued)

(52) U.S. Cl.
CPC ............. *B67D 1/08* (2013.01); *B67D 1/0039* (2013.01); *B67D 1/0888* (2013.01); *G07F 13/00* (2013.01);
(Continued)

(58) Field of Classification Search
None
See application file for complete search history.

(56) References Cited

U.S. PATENT DOCUMENTS

| | | | |
|---|---|---|---|
| 6,394,312 B1 * | 5/2002 | Endou ................... | B67D 1/0032 222/129.1 |
| 2009/0069930 A1 * | 3/2009 | Peters ................... | B67D 1/0041 700/236 |

(Continued)

FOREIGN PATENT DOCUMENTS

| JP | S61-282991 A | 12/1986 |
|---|---|---|
| JP | H08-315227 A | 11/1996 |

(Continued)

OTHER PUBLICATIONS

International Search Report issued in Application No. PCT/JP2015/005398 dated Jan. 26, 2016, with English translation.

*Primary Examiner* — Fateh M Obaid
(74) *Attorney, Agent, or Firm* — McDermott Will & Emery LLP

(57) ABSTRACT

A beverage supplying device, wherein the device is provided with a controller for discharging the beverage selected from multiple types of beverages from a prescribed nozzle, and a storage unit for storing data that indicates the dilution ratio of each of the beverages, the remaining amount of each of the syrups, and the supply amount per container of the beverage. The controller calculates the discharge amount per container of syrup used to produce the selected beverage on the basis of the data indicating the dilution ratio of the selected beverage, and the data indicating the supply amount per container of the beverage. Next, the controller calculates the number of selected beverages available for sale on the basis of the data indicating the remaining amount of syrup (Continued)

used to produce the selected beverage and the calculated discharge amount, and displays available-for-sale numbers.

6 Claims, 8 Drawing Sheets

(51) Int. Cl.
    *B67D 1/00*           (2006.01)
    *B67D 1/10*           (2006.01)
    *A47J 31/44*         (2006.01)

(52) U.S. Cl.
    CPC ............... *A47J 31/44* (2013.01); *B67D 1/108* (2013.01); *B67D 2210/00091* (2013.01)

(56) References Cited

U.S. PATENT DOCUMENTS

| | | | | |
|---|---|---|---|---|
| 2011/0042414 A1* | 2/2011 | Tachibana | ................. | A23L 2/54 |
| | | | | 222/129.1 |
| 2013/0231774 A1* | 9/2013 | Tilton | ................... | G07F 13/065 |
| | | | | 700/233 |
| 2017/0313569 A1* | 11/2017 | Yajima | .................... | B67D 1/08 |
| 2017/0334701 A1* | 11/2017 | Kuboi | .................. | B67D 1/0027 |

FOREIGN PATENT DOCUMENTS

| | | |
|---|---|---|
| JP | H10-269443 A | 10/1998 |
| JP | 2003-006732 A | 1/2003 |
| JP | 2005-246168 A | 9/2005 |
| JP | 4122932 B2 | 7/2008 |
| JP | 2010-541034 A | 12/2010 |

* cited by examiner

| BEVERAGE | DILUTION RATIO |
|---|---|
| BRAND A | DILUTED WATER r1: MAIN SYRUP r2 |
| BRAND A LEMON | DILUTED WATER r3: MAIN SYRUP r4: TOPPING SYRUP r5 |
| BRAND A PEACH | DILUTED WATER r6: MAIN SYRUP r7: TOPPING SYRUP r8 |
| ... | ... |

*FIG. 5*

| BRAND | PHYSICAL BUTTON |
|---|---|
| D | 3a |
| G | 3c |
| A, B, C, E, F, H, I, J, WATER, CARBONATED WATER | 3b |

FIG. 6

BEVERAGE SUPPLYING DEVICE

RELATED APPLICATIONS

This application is the U.S. National Phase under 35 U.S.C. § 371 of International Application No. PCT/JP2015/005398, filed on Oct. 27, 2015, which in turn claims the benefit of Japanese Application No. 2014-223632, filed on Oct. 31, 2014, the disclosures of which are incorporated by reference herein.

TECHNICAL FIELD

The present invention relates to a beverage supplying apparatus that supplies a beverage.

BACKGROUND ART

Conventionally, beverage supplying apparatuses are known which produce a beverage by mixing a syrup with diluted water and/or carbonated water and supply the produced beverage. Such beverage supplying apparatuses can normally produce and supply a plurality of types of beverages.

More specifically, when the beverage supplying apparatus receives an operation for instructing discharge of a selected beverage, it discharges a syrup necessary to produce the beverage from among different types of syrups respectively stored in a plurality of syrup tanks. At the same time, the beverage supplying apparatus discharges diluted water and/or carbonated water and produces a beverage by mixing the syrup with the diluted water and/or carbonated water.

When the remaining amount of syrup in the syrup tank of such a beverage supplying apparatus is reduced, an employee in a store or the like in which the beverage supplying apparatus is installed needs to replace the syrup tank with a new one.

In order to replace the beverage tank at appropriate timing, a technique for displaying the remaining amount of beverage in the beverage tank is being proposed. For example, with a beverage supplying apparatus disclosed in Patent Literature (hereinafter referred to as "PTL") 1, when a beverage is discharged, the apparatus calculates the remaining amount of the beverage tank by subtracting the discharge amount from the capacity of the beverage tank and causes a display device to display the calculated remaining amount of the beverage tank.

CITATION LIST

Patent Literature

PTL 1
Japanese Patent Publication No. 4122932

SUMMARY OF INVENTION

Technical Problem

However, the beverage supplying apparatus disclosed in PTL 1 is intended to supply one type of beverage (e.g., beer) and display the remaining amount of the beverage, and is not intended to produce and supply each beverage using different syrups or display the remaining amount of each syrup.

Even if the discharge amount for each syrup is subtracted from the capacity of each syrup tank and the remaining amount for each syrup is displayed, by applying the technique disclosed in PTL 1 to the beverage supplying apparatus that supplies a plurality of types of beverages, there are still problems to be solved as follows.

That is, when each beverage is produced using different syrups, the amount per container of syrup used to produce a beverage varies. Therefore, even when the remaining amounts of the plurality of syrups are the same, the number of possible sales may vary from one beverage to another. Therefore, there is a problem that it is difficult for the employee to grasp appropriate replenishment timing (syrup tank replacement timing) of each syrup by just looking at the display of a remaining amount of each syrup.

From above, there is a strong demand for development of a technique of a beverage supplying apparatus that supplies a plurality of types of beverages making it possible to easily grasp appropriate replenishment timing of each syrup.

An object of the present invention is to provide a beverage supplying apparatus making it possible to easily grasp appropriate replenishment timing of each syrup.

Solution to Problem

A beverage supplying apparatus according to the present invention is an apparatus that supplies a beverage in which a syrup and at least one of diluted water and carbonated water are mixed, the apparatus including: a control section that causes a beverage selected from among a plurality of types of beverages to be discharged from a predetermined nozzle; and a storage section that stores data indicating a dilution ratio for each beverage, a remaining amount for each syrup and a supply amount of the beverage per container, in which: the control section calculates a discharge amount per container of a syrup used to produce the selected beverage, based on data indicating the dilution ratio of the beverage selected from among the plurality of types of beverages and the data indicating the supply amount of the beverage per container, and the control section calculates a sellable amount of the selected beverage based on data indicating a remaining amount of the syrup used to produce the selected beverage and the discharge amount of the syrup per container, and displays the sellable amount on a screen.

Advantageous Effects of Invention

According to the present invention, it is possible to easily grasp appropriate replenishment timing of each syrup.

BRIEF DESCRIPTION OF DRAWINGS

FIG. 5 is a diagram illustrating dilution ratio data used to control the beverage supplying apparatus according to the embodiment of the present invention;

FIG. 6 is a diagram illustrating a table used to control the beverage supplying apparatus according to the embodiment of the present invention;

DESCRIPTION OF EMBODIMENTS

Hereinafter, embodiments of the present invention will be described with reference to the accompanying drawings.

Figure 1:
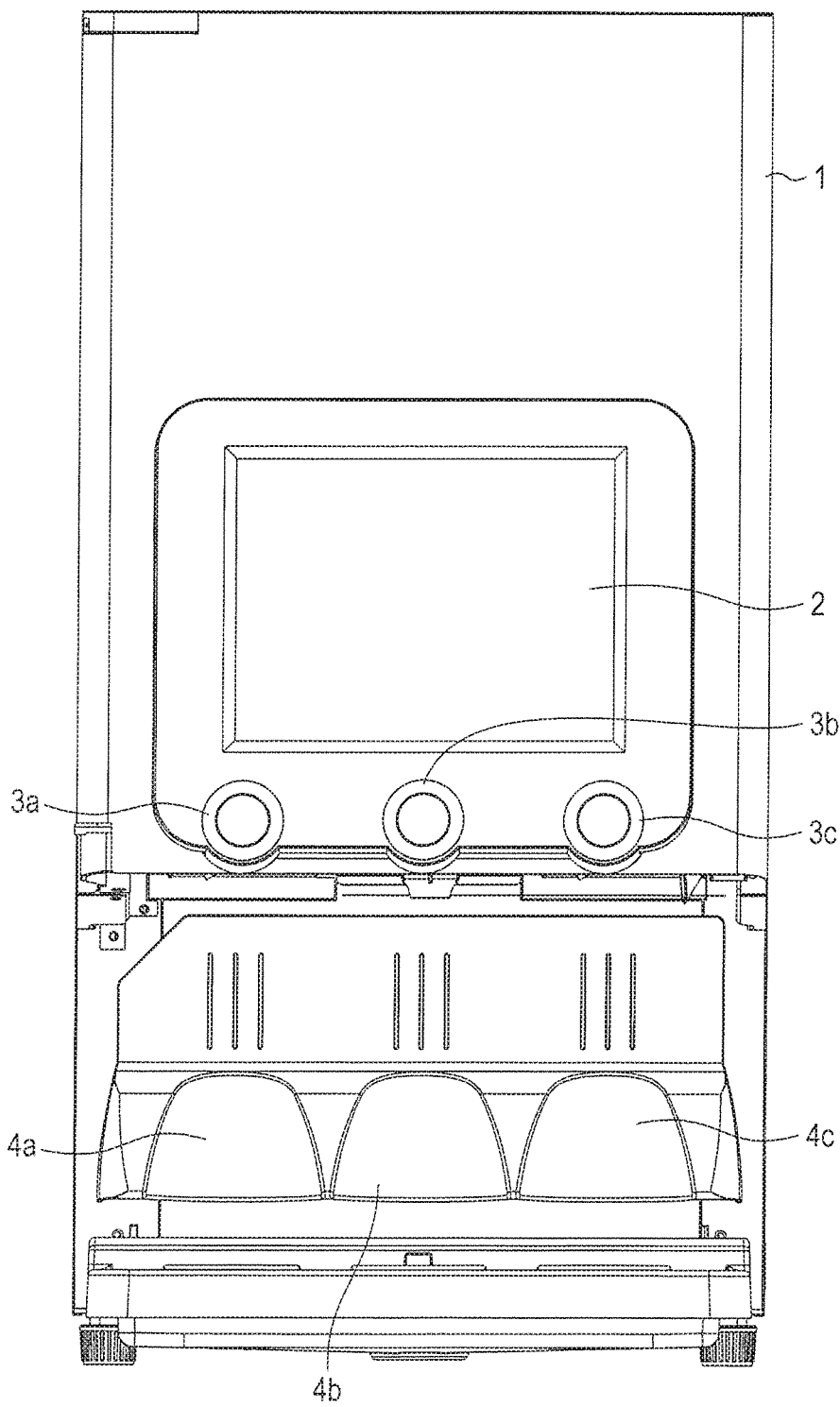
FIG. 1 is a front view of a beverage supplying apparatus according to an embodiment of the present invention.
Figure 2:
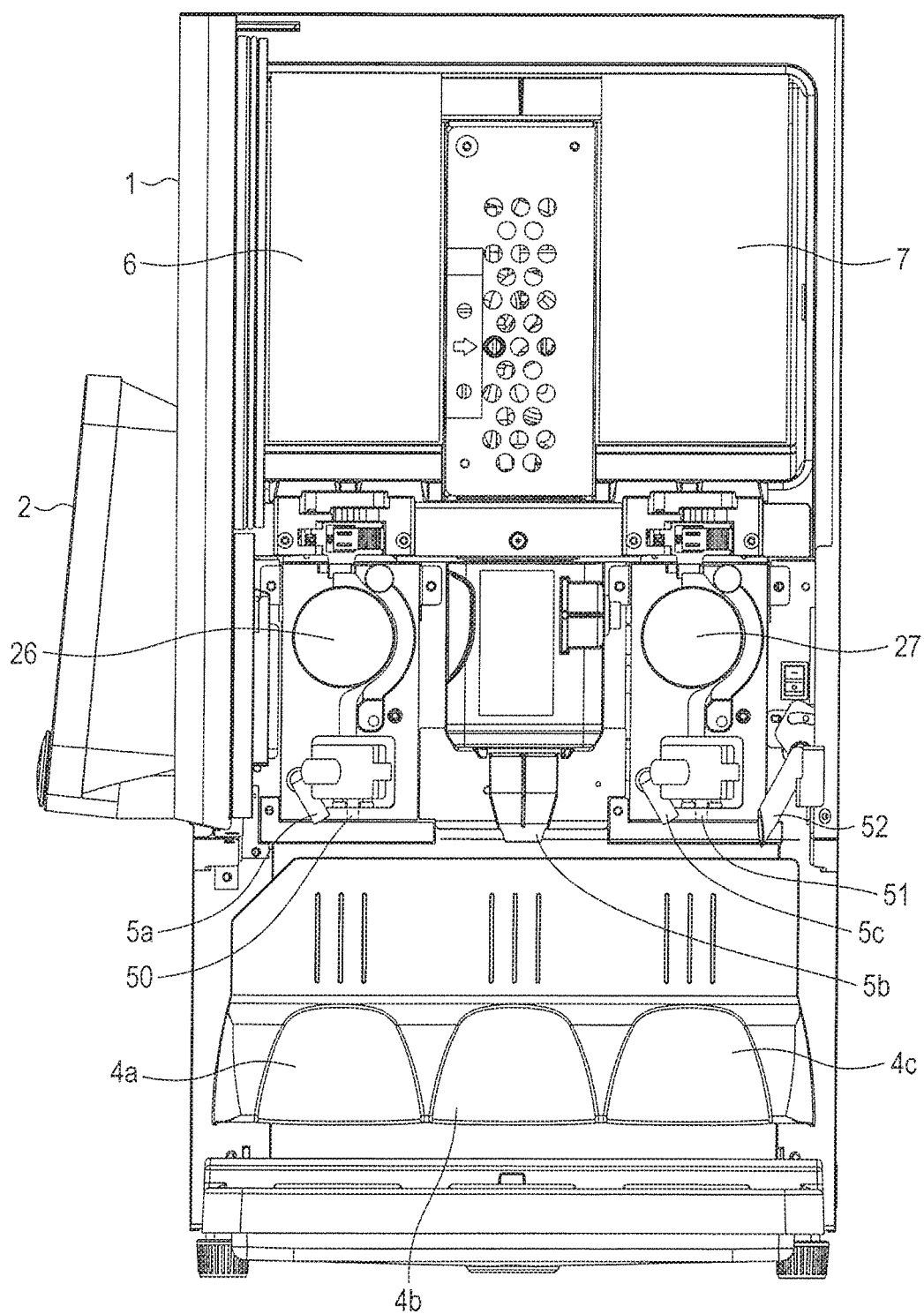
FIG. 2 is a front view illustrating an interior of the beverage supplying apparatus according to the embodiment of the present invention when a front door is opened.
Figure 3:
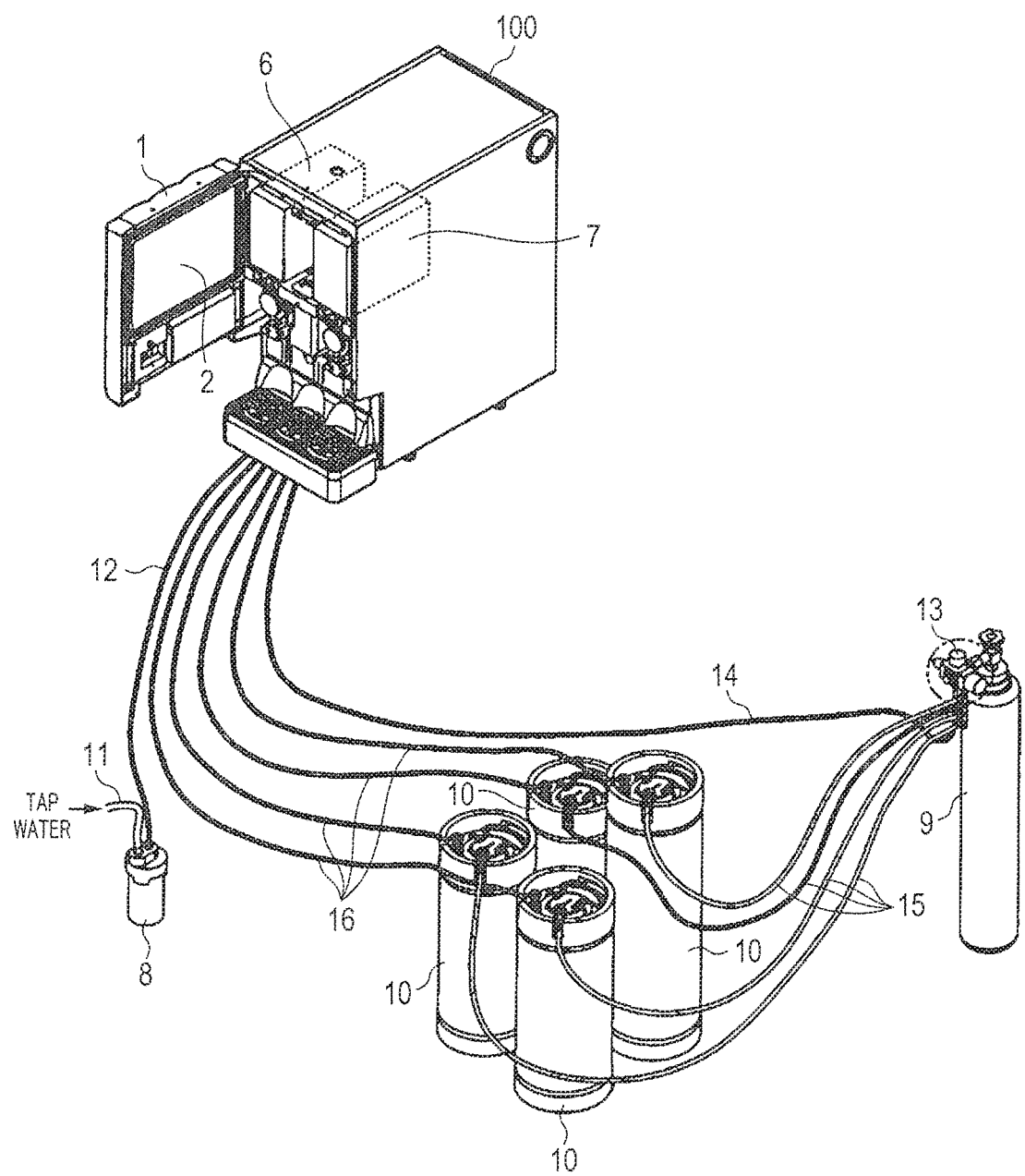
FIG. 3 is a diagram illustrating an external configuration of the beverage supplying apparatus according to the embodiment of the present invention.

First, a configuration example of beverage supplying apparatus 100 according to an embodiment of the present invention will be described using FIG. 1 to FIG. 3. FIG. 1 is a front view of beverage supplying apparatus 100 according to an embodiment of the present invention; FIG. 2 is a front view of beverage supplying apparatus 100 according to the embodiment of the present invention, illustrating an interior thereof when a front door is opened. FIG. 3 is a diagram illustrating an external configuration of the beverage supplying apparatus according to the embodiment of the present invention.

As shown in FIG. 1, beverage supplying apparatus 100 is provided with touch panel 2 on front door 1 that can be opened/closed. Touch panel 2 is an operation receiving section that displays beverage choices for a user of beverage supplying apparatus 100 and receives an operation for selecting a beverage by the user.

More specifically, touch panel 2 displays choices for a main syrup constituting a main beverage and diluted with diluted water and/or carbonated water and choices for a topping syrup added to the main beverage as a flavor, and performs processing of receiving an operation for selecting the main syrup and the topping syrup from the user.

As shown in FIG. 1, physical buttons 3a to 3c are provided at lower parts of touch panel 2. Physical buttons 3a to 3c receive an operation for instructing discharge of a beverage from the user. Container placement areas 4a to 4c for the user to place container (glass, cup, or the like) are provided below physical buttons 3a to 3c.

Physical button 3a corresponds to container placement area 4a, and also corresponds to diluted water nozzle 5a and syrup nozzle 50 shown in FIG. 2. Furthermore, physical button 3b corresponds to container placement area 4b, and also corresponds to nozzle 5b shown in FIG. 2. Physical button 3c corresponds to container placement area 4c, and also corresponds to diluted water nozzle 5c, syrup nozzle 5 and carbonated water nozzle 52 shown in FIG. 2.

The user performs an operation for selecting a beverage on touch panel 2, then places a container at one of container placement areas 4a to 4c and presses one of physical buttons 3a to 3c.

When, for example, physical button 3a is pressed, a syrup in bag-in-box (hereinafter referred to as "BIB") 6 shown in FIG. 2 is discharged from syrup nozzle 50 via BIB tube pump 26 and becomes a discharge flow. This syrup discharge flow collides and is mixed with a discharge flow of diluted water discharged from diluted water nozzle 5a. A beverage is thus produced. The beverage produced in this way is supplied to a container placed at container placement area 4a.

When, for example, physical button 3b is pressed, a syrup is mixed with diluted water and/or carbonated water at nozzle 5b and a beverage is thus produced. The beverage produced in this way is discharged from nozzle 5b and supplied to a container placed at container placement area 4b.

When, for example, physical button 3c is pressed, a syrup in BIB 7 shown in FIG. 2 is discharged from syrup nozzle 51 via BIB tube pump 27 and becomes a discharge flow. This syrup discharge flow collides and is mixed with a discharge flow of diluted water discharged from diluted water nozzle 5c and/or a discharge flow of carbonated water discharged from carbonated water nozzle 52. A beverage is thus produced. The beverage produced in this way is supplied to a container placed at container placement area 4c.

Note that each aforementioned beverage is supplied to each container while physical button 3a to 3c is being pressed.

Aforementioned carbonated water nozzle 52 may be provided on a BIB 6 side or may be provided on both BIB 6 and BIB 7 sides.

Aforementioned BIBs 6 and 7 are provided in a refrigerating area. BIBs 6 and 7 store syrups requiring cool storage. Syrups not requiring cool storage are stored in syrup tank 10 which will be described later using FIG. 3.

Syrups referred to here in the present embodiment are assumed to include not only condensed liquid containing sugar but also condensed liquid not containing sugar (e.g., stock solution of green tea or tea).

Aforementioned nozzle 5b is a mixing section that produces a main beverage by mixing diluted water and/or carbonated water with a main syrup at a prescribed ratio and produces a beverage by mixing an undiluted topping syrup with the main beverage (hereinafter referred to as "flavor-added beverage"). The flavor-added beverage produced at nozzle 5b is discharged from nozzle 5b into a container placed at container placement area 4b.

Mixing two kinds of syrups, that is, main syrup and topping syrup, can drastically increase the number of beverage flavor choices to be provided to the user.

Here, the main syrup and the topping syrup are stored in syrup tanks 10 shown in FIG. 3 which will be described below. Note that nozzle 5b also discharges, in addition to the above flavor-added beverage, water only or carbonated water only.

Furthermore, as shown in FIG. 3, beverage supplying apparatus 100 is provided with cleaning filter 8, carbon dioxide gas cylinder 9 and a plurality of syrup tanks 10.

Cleaning filter 8 cleans tap water supplied from blade tube 11 and supplies the cleaned water into beverage supplying apparatus 100 via blade tube 12. The cleaned water is used as diluted water or pressurized water or supplied as drinking water. Blade tube 12 is connected, for example, to a carbonator (not shown) provided inside beverage supplying apparatus 100, diluted water nozzles 5a and 5c, and nozzle 5b.

Carbon dioxide gas cylinder 9 stores a carbon dioxide gas. This carbon dioxide gas is supplied to carbonator 23 via blade tube 14 at a prescribed pressure (e.g., 0.6 MPa) set in gas regulator 13. This carbon dioxide gas is further supplied to each syrup tank 10 via blade tube 15 at a prescribed pressure (e.g., 0.2 MPa) set in gas regulator 13.

A plurality of syrup tanks 10 store different syrups. As described above, these syrups are used as a main syrup or topping syrup. These syrups are pushed out under a pressure of the gas supplied from carbon dioxide gas cylinder 9 and supplied to nozzle 5b via blade tube 16.

Figure 4:
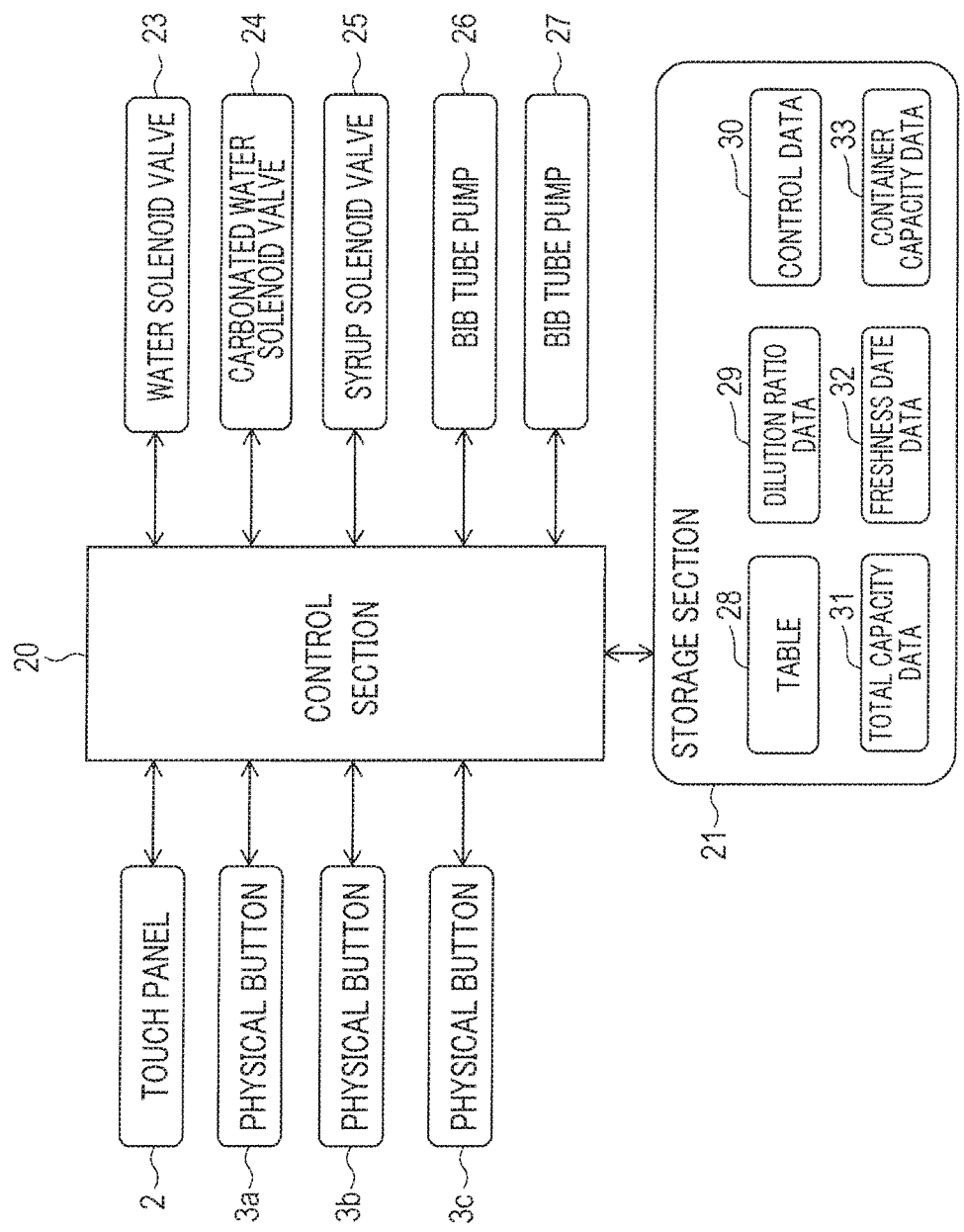
FIG. 4 is a functional block diagram of the beverage supplying apparatus according to the embodiment of the present invention.

Next, a configuration of control section 20 and peripheral parts thereof of beverage supplying apparatus 100 according to the embodiment of the present invention will be described using FIG. 4. FIG. 4 is a functional block diagram of beverage supplying apparatus 100 according to the embodiment of the present invention.

Beverage supplying apparatus 100 is provided with control section 20, storage section 21, water solenoid valve 23, carbonated water solenoid valve 24, syrup solenoid valve 25, and BIB tube pumps 26 and 27 in addition to touch panel 2, and physical buttons 3a to 3c described in FIG. 1.

Control section 20 is a control device such as a CPU (central processing unit). Control section 20 controls each functional section provided for beverage supplying apparatus 100. Storage section 21 is a memory device such as a ROM (read only memory) or RAM (random access memory). Storage section 21 stores table 28, dilution ratio data 29, control data 30, total capacity data 31, freshness date data 32, container capacity data 33 or the like which will be described later.

Control section 20 controls touch panel 2 and controls a beverage supply based on the data read from storage section 21. Control of touch panel 2 will be described in detail later using FIG. 7 and FIG. 8. Here, control of a beverage supply will be described first.

When the user performs an operation for selecting a beverage on touch panel 2, control section 20 reads data relating to the selected beverage from storage section 21 and produces a beverage based on the read data. This data is, for example, dilution ratio data 29 and control data 30.

Dilution ratio data 29 is data indicating a dilution ratio between diluted water and/or carbonated water and main syrup and/or topping syrup.

FIG. 5 shows an example of dilution ratio data 29. As shown in FIG. 5, dilution ratio data 29 registers a dilution ratio when producing a beverage in association with the type of the beverage. In FIG. 5, r1 to r8 represent predetermined numerical values. Note that FIG. 5 shows brands using alphabetical letters.

For example, dilution ratio data 29 registers diluted water r1:main syrup r2 as a dilution ratio of a beverage of brand A. Thus, when the user selects the beverage of brand A, a beverage in which diluted water and a main syrup (syrup of brand A) are mixed is produced based on the above dilution ratio.

For example, dilution ratio data 29 registers diluted water r3:main syrup r4:topping syrup r5 as the dilution ratio of a lemon flavor beverage of brand A. Thus, when the user selects the lemon flavor beverage of brand A, a beverage in which diluted water, the main syrup (syrup of brand A) and a topping syrup (syrup of lemon flavor) are mixed is produced based on the dilution ratio.

Furthermore, for example, dilution ratio data 29 registers diluted water r6:main syrup r7:topping syrup r8 as a dilution ratio of a peach flavor beverage of brand A. Thus, when the user selects the peach flavor beverage of brand A, a beverage in which diluted water, a main syrup (syrup of brand A) and a topping syrup (syrup of peach flavor) are mixed is produced based on the above dilution ratio.

In this way, a dilution ratio is set in dilution ratio data 29 in advance for each beverage that can be produced or supplied by beverage supplying apparatus 100.

Examples of control data 30 include setting data for controlling opening/closing of each solenoid valve (water solenoid valve 23, carbonated water solenoid valve 24, syrup solenoid valve 25) in accordance with the dilution ratio and setting data for controlling driving of BIB tube pumps 26 and 27.

Note that a case will be described hereinafter where supply control of water, carbonated water, main syrup and topping syrup is performed through opening/closing of each solenoid valve, but supply control may also be performed using a pump or the like.

When the user performs an operation for selecting a beverage on touch panel 2, control section 20 reads table 28 from storage section 21. Table 28 is information indicating physical button 3a to 3c corresponding to the beverage selected by the user.

An example of this table 28 is shown in FIG. 6. As shown in FIG. 5, table 28 registers information on physical buttons 3a to 3c in association with beverage brands, physical buttons 3a to 3c corresponding to nozzles from which beverages of the brands are discharged respectively. Note that FIG. 6 shows brands using alphabetical letters.

For example, table 28 associates brand D with physical button 3a. Thus, when the user selects a beverage of brand D and presses physical button 3a, the beverage of brand D produced as described above is supplied to a container placed at container placement area 4a corresponding to physical button 3a.

Furthermore, table 28 associates brand G with physical button 3c. Thus, when the user selects a beverage of brand G and presses physical button 3c, the beverage of brand G produced as described above is supplied to a container placed at container placement area 4c corresponding to physical button 3c.

Furthermore, table 28 associates brands A to C, E, F, H to J, water and carbonated water with physical button 3b. Thus, when the user selects one beverage of brand A to C, E, F, H to J, water and carbonated water and presses physical button 3b, the beverage produced as described above (e.g., flavor-added beverage, water, carbonated water) is supplied to a container placed at container placement area 4b corresponding to physical button 3b. Note that water and carbonated water are not brands, but water and carbonated water will be handled as one type of brand in the present embodiment for convenience.

Upon detecting that one of physical buttons 3a to 3c is pressed, control section 20 controls at least one of opening/closing of solenoid valves 23 to 25 and driving of BIB tube pumps 26 and 27 and supplies water, carbonated water, main syrup or topping syrup to a nozzle corresponding to pressed physical button 3a to 3c (diluted water nozzle 5a, 5c, nozzle 5b, syrup nozzle 50, 51).

When, for example, the user selects one beverage of brand A to C, E, F, H to J and presses physical button 3b, control section 20 opens syrup solenoid valve 25 provided between syrup tank 10 storing the syrup (main syrup) of the selected brand and nozzle 5b and opens water solenoid valve 23 and/or carbonated water solenoid valve 24. Note that when opening water solenoid valve 23 and carbonated water solenoid valve 24, control section 20 causes water solenoid valve 23 and carbonated water solenoid valve 24 to be alternately opened, but control section 20 may also cause them to be simultaneously opened.

Thus, the syrup is mixed with water and/or carbonated water at nozzle 5b and a resultant beverage is discharged from nozzle 5b.

Note that when the user selects a flavor-added beverage, control section 20 opens syrup solenoid valve 25 provided between syrup tank 10 storing a topping syrup with a flavor selected by the user (e.g., fruit flavor such as orange, grape) and nozzle 5b in addition to syrup solenoid valve 25 provided between syrup tank 10 storing the main syrup and nozzle 5b.

This makes it possible to supply also the topping syrup to nozzle 5*b* in addition to the main syrup and produce a flavor-added beverage by mixing these syrups with water and/or carbonated water.

On the other hand, when the user selects water and presses physical button 3*b*, control section 20 opens water solenoid valve 23 provided between cleaning filter 8 and nozzle 5*b*. This causes water to be discharged from nozzle 5*b*.

Furthermore, when the user selects carbonated water and presses physical button 3*b* corresponding to nozzle 5*b*, control section 20 opens carbonated water solenoid valve 24 provided between the carbonator and nozzle 5*b*. This causes carbonated water to be discharged from nozzle 5*b*.

Similarly, when the user selects a beverage of brand D and presses physical button 3*a*, control section 20 drives BIB tube pump 26 provided between BIB 6 storing the selected syrup of brand D and syrup nozzle 50 under a predetermined condition. Simultaneously, control section 20 opens water solenoid valve 23 and causes diluted water nozzle 5*a* to discharge diluted water.

This causes a beverage in which the syrup of brand D and diluted water are mixed together to be supplied to a container placed at container placement area 4*a*.

When the user selects a beverage of brand G and presses physical button 3*c*, control section 20 drives BIB tube pump 27 provided between BIB 7 storing the selected syrup of brand G and syrup nozzle 51 under a predetermined condition. Simultaneously, control section 20 opens water solenoid valve 23 and/or carbonated water solenoid valve 24 and causes diluted water nozzle 5*c* and/or carbonated water nozzle 52 to discharge diluted water and/or carbonated water.

This causes a beverage in which the syrup of brand G and water and/or carbonated water are mixed together to be supplied to a container placed at container placement area 4*c*.

An example of supply control of a beverage executed by control section 20 has been described so far.

Figure 7:
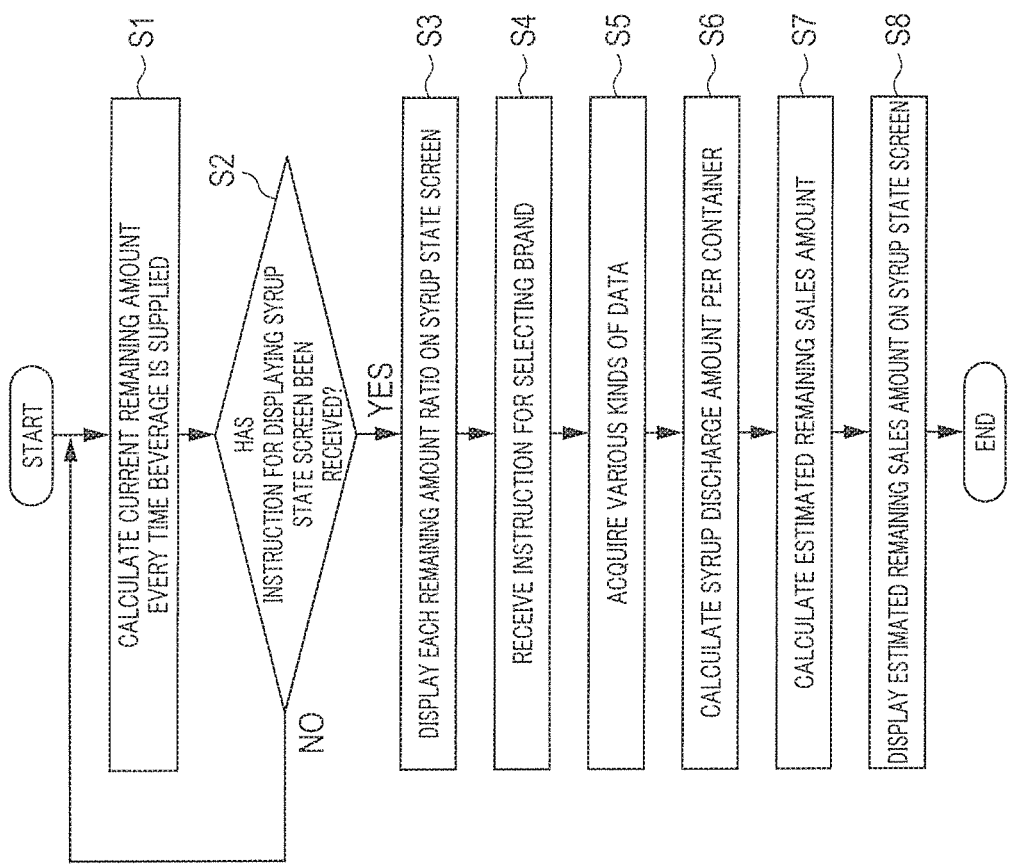
FIG. 7 is a flowchart illustrating a control example of the beverage supplying apparatus according to the embodiment of the present invention.
Figure 8:
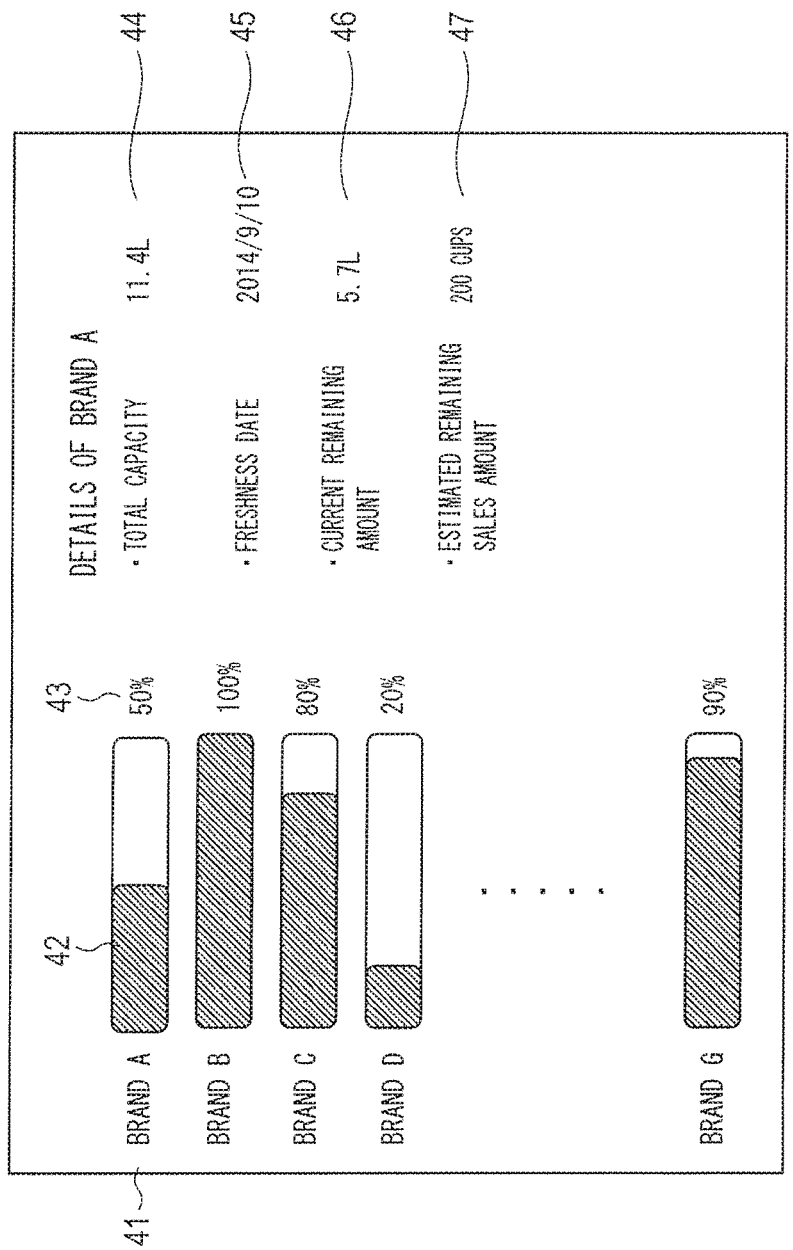
FIG. 8 is a diagram illustrating a display example of a state display screen according to a control example of the beverage supplying apparatus according to the embodiment of the present invention.

Next, a control example of screen display on touch panel 2 executed by control section 20 will be described using FIG. 7 and FIG. 8. Here, a control example where a syrup state screen showing a state of each syrup is displayed on touch panel 2 will be described. FIG. 7 is a flowchart illustrating this control example. FIG. 8 is a diagram illustrating a display example of the syrup state screen on touch panel 2.

First, every time a beverage is supplied, control section 20 calculates current remaining amount (step S1). The "current remaining amount" refers to an amount of syrup remaining in the current syrup tank or BIB.

Here, a specific example of calculation of a current remaining amount will be described. When, for example, a beverage of brand A is produced or supplied, control section 20 detects the amount of syrup of brand A used to produce the beverage, that is, the discharge amount of the syrup of brand A discharged from nozzle 5*b*.

For example, control section 20 counts pulses of a syrup flowmeter (not shown) and thereby detects the flow rate (discharge amount) of the syrup of brand A. The syrup flowmeter is disposed, for example, between syrup solenoid valve 25 and nozzle 5*b* and generates a pulse every time a unit amount of syrup passes.

Note that as described above, the present embodiment will describe a case where supply control of the syrup (main syrup, topping syrup) is performed by opening/closing each solenoid valve, and when supply control is performed using a pump or the like, control section 20 counts pulses of a water flowmeter or carbonated water flowmeter (not shown), controls the number of revolutions of the syrup motor and controls the flow rate of a syrup sent from the pump based on the pulses.

Control section 20 may also detect the flow rate (discharge amount) of the syrup of brand A during this control. The water flowmeter is disposed between water solenoid valve 23 and nozzle 5*b* and generates a pulse every time a unit amount of water passes. The carbonated water flowmeter is disposed between carbonated water solenoid valve 24 and nozzle 5*b*, and generates a pulse every time a unit amount of carbonated water passes.

Next, control section 20 reads total capacity data 31 from storage section 21. Total capacity data 31 is data indicating a total capacity of syrup tank 10 or BIB 6, 7 (in other words, the amount of syrup stored in syrup tank 10 or BIB 6 or 7 when the tank is full). The total capacity is set in advance by an administrator of beverage supplying apparatus 100 of a beverage maker or store or the like. Here, control section 20 reads total capacity data 31 of syrup tank 10 storing the syrup of brand A from storage section 21, for example.

Next, control section 20 calculates a current remaining amount by subtracting the detected discharge amount of the syrup from the read total capacity of total capacity data 31. Control section 20 causes storage section 21 to store current remaining amount data indicating the calculated current remaining amount. Here, by way of example, control section 20 calculates the remaining amount in syrup tank 10 storing the syrup of brand A and stores current remaining amount data indicating the remaining amount in storage section 21.

Furthermore, control section 20 calculates a remaining amount ratio which is a ratio of the current remaining amount to the total capacity and causes storage section 21 to store remaining amount ratio data indicating the remaining amount ratio. Here, for example, control section 20 calculates a ratio of the current remaining amount of the syrup of brand A to the total capacity of syrup tank 10 storing the syrup of brand A and stores remaining amount ratio data indicating the ratio in storage section 21.

A specific example of calculation of the current remaining amount has been described so far. Hereinafter, the flowchart in FIG. 7 will be described again.

After the processing in step S1, control section 20 determines whether or not in instruction for displaying the syrup state screen has been received (step S2). For example, the administrator of beverage supplying apparatus 100 can operate an instruction for displaying the syrup state screen on touch panel 2 or the like. When the above operation is performed on touch panel 2, control section 20 determines that an instruction for displaying the syrup state screen has been received.

As a result of the determination in step S2, if the instruction for displaying the syrup state screen has not been received (step S2: NO), the processing in step S1 is executed again.

On the other hand, as a result of the determination in step S2, if the instruction for displaying the syrup state screen has been received (step S2: YES), control section 20 reads the remaining amount ratio data for each aforementioned syrup from storage section 21.

Next, control section 20 causes touch panel 2 to display the syrup state screen and causes the syrup state screen to display the remaining amount ratio of the syrup for each brand based on each piece of the read remaining amount ratio data (step S3).

Here, a display example of the syrup state screen in step S3 will be described using FIG. 8. As shown in FIG. 8, a left side region of the syrup state screen displays, for example, brand name information 41 and remaining amount ratio information 42, 43.

Brand name information 41 indicates the name of a brand of a beverage. In the example in FIG. 8, brands A to G are displayed as brand name information 41.

Remaining amount ratio information 42, 43 indicates the remaining amount ratio of a syrup used for a beverage of a brand indicated by brand name information 41. Remaining amount ratio information 42 indicates a remaining amount ratio of a syrup using a bar and remaining amount ratio information 43 indicates a numerical value of the remaining amount ratio of a syrup. Note that in the example in FIG. 8, both pieces of remaining amount ratio information 42 and 43 are displayed, but either one may also be displayed.

From the display of such a syrup state screen, the administrator of beverage supplying apparatus 100 can easily grasp the remaining amount ratio of a syrup for each brand.

Note that in FIG. 8, the right region of the syrup state screen shows total capacity information 44, freshness date information 45, current remaining amount information 46 and estimated remaining sales amount information 47, but these pieces of information will be described later.

The display example of the syrup state screen in step S3 has been described so far. Hereinafter, the flowchart in FIG. 7 will be described again.

After the processing in step S3, control section 20 receives an instruction for selecting a brand on the syrup state screen (step S4). For example, the administrator of beverage supplying apparatus 100 can perform an operation for selecting one of brands A to G on touch panel 2 or the like.

Next, control section 20 acquires current remaining amount data, dilution ratio data 29, total capacity data 31, freshness date data 32 and container capacity data 33 from storage section 21 (step S5). For example, when brand A is selected in step S4, the above data is as follows.

The current remaining amount data is data indicating the current remaining amount of the syrup of brand A calculated in above step S1.

Dilution ratio data 29 is dilution ratio data 29 of the beverage of brand A. Dilution ratio data 29 here is data indicating a dilution ratio between diluted water and/or carbonated water and the main syrup only (that is, the topping syrup is not included) (e.g., dilution ratio data 29 at the top shown in FIG. 5).

Total capacity data 31 is data indicating a total capacity of syrup tank 10 storing the syrup of brand A.

Freshness date data 32 is data indicating a freshness date of the syrup of brand A. This freshness date is set in advance, for example, by the administrator of beverage supplying apparatus 100.

Container capacity data 33 is data indicating the capacity of a container to which a beverage is supplied and is data indicating a supply amount of beverage per container. The capacity of the container is set in advance, for example, by the administrator of beverage supplying apparatus 100.

As in the present embodiment, if a beverage is supplied to a container only when the user presses physical button 3a to 3c, the capacity of a beverage supplied by one sale is not known. Thus, an average value of the amount of beverage supplied to the user by one beverage supply (e.g., 180 ml, the setting can be changed depending on the container used) is set in container capacity data 33.

When a portion sales format is adopted such as S size (100 ml), M size (200 ml) and L size (300 ml), container capacity data 33 may be determined depending on the container used by the user. Note that the container capacity is constant irrespective of the brand selected in step S4.

Next, control section 20 calculated a syrup discharge amount per container based on dilution ratio data 29 and container capacity data 33 (step S6). For example, when the dilution ratio is diluted water r1:main syrup r2 and the container capacity is v1 shown in FIG. 5, syrup discharge amount v2 per container is calculated by the following equation.

$$v2 = v1 \times r2/(r1+r2)$$

Next, control section 20 calculates an estimated remaining sales amount based on the current remaining amount data and the syrup discharge amount per container (step S7). The estimated remaining sales amount is a value indicating how many more sales can be expected expressed by the number of containers when a beverage (beverage in which diluted water and/or carbonated water and the main syrup are mixed) is produced using all the current remaining amount of syrup. For example, if the current remaining amount is v3 and syrup discharge amount per container is v2, estimated remaining sales amount E is calculated by the following equation.

$$E = v3/v2$$

Next, control section 20 causes an estimated remaining sales amount to be displayed on the syrup state screen being displayed (step S8). At this time, control section 20 may also cause various kinds of information based on total capacity data 31, freshness date data 32 and current remaining amount data to be displayed.

Here, a display example of the syrup state screen in step S8 will be described using FIG. 8. Here, a case will be described as an example where brand A is selected in step S4.

As shown in FIG. 8, total capacity information 44, freshness date information 45, current remaining amount information 46 and estimated remaining sales amount information 47 are displayed on a right side region of the syrup state screen, for example, as detailed information of the selected syrup of brand A.

Note that as described above, brand name information 41 and remaining amount ratio information 42, 43 are displayed in the left side region of the syrup state screen. Here, in order to make recognizable the fact that brand A is selected, for example, information 41 to 43 of brand A may be shown in a different mode from other brand information 41 to 43 (e.g., the display color may be changed or each piece of information may be decorated).

Total capacity information 44 indicates a total capacity of syrup tank 10 storing the syrup of brand A. In the example in FIG. 8, the unit of the total capacity is L (liter).

Freshness date information 45 indicates a freshness date of the syrup of brand A. In the example in FIG. 8, the freshness date is expressed by year, month and day.

Current remaining amount information 46 indicates a current remaining amount of the syrup of brand A. In the example in FIG. 8, the unit of the current remaining amount is L (liter).

Estimated remaining sales amount information 47 indicates an estimated remaining sales amount of the beverage of brand A. In the example in FIG. 8, the unit of the estimated remaining sales amount is the number of containers (cups).

A display example of the syrup state screen in step S8 has been described so far.

As described above, the present embodiment calculates a syrup discharge amount per container based on a container capacity and a dilution ratio of a syrup, calculates and displays an estimated remaining sales amount based on the syrup discharge amount per container and the current remaining amount of the syrup, and can thereby allow the administrator of beverage supplying apparatus 100 to grasp appropriate replenishment timing of each syrup (appropriate replacement timing of the syrup tank or BIB).

The embodiment of the present invention has been described so far, but the present invention is not limited to the above embodiment and various modifications can be made.

When, for example, a predetermined brand is selected on the above syrup state screen, the number of days until the beverage of the brand (beverage in which diluted water and/or carbonated water and the main syrup are mixed together) is sold out (hereinafter referred to as "selling out period") may be calculated and the selling out period may be displayed on the syrup state screen.

A specific example of such a case will be described below. First, control section 20 records an actual sales amount for every predetermined period (e.g., one week) for each beverage and calculates an average amount of sales per unit period (e.g., one day). Control section 20 then calculates a period (e.g., the number of days) for the beverage of the brand selected on the syrup state screen to be sold out by dividing the aforementioned estimated remaining sales amount by the average amount of sales and displays the period until the beverage is sold out on the syrup state screen.

Note that although the average amount of sales is used above to calculate the period until the beverage is sold out, the recorded actual sales amount itself may be used or a predicted amount of sales per predetermined unit period may be used.

This allows the administrator of beverage supplying apparatus 100 to easily grasp appropriate replenishment timing of each syrup (appropriate replacement timing of the syrup tank or BIB).

Furthermore, control section 20 may calculate an estimated selling out date by adding the selling out period to the current date, and if the estimated selling out date exceeds the freshness date of a syrup used to produce the beverage of the brand selected on the syrup state screen, control section 20 may display warning information (e.g., a message stating that the syrup may not be sold out even when the freshness date is past) on the syrup state screen.

The disclosure of Japanese Patent Application No. 2014-223632, filed on Oct. 31, 2014, including the specification, drawings and abstract is incorporated herein by reference in its entirety.

INDUSTRIAL APPLICABILITY

The present invention is useful for a beverage supplying apparatus that supplies a beverage.

REFERENCE SIGNS LIST

1 Front door
2 Touch panel
3a, 3b, 3c Physical button
4a, 4b, 4c Container placement area
5a, 5c Diluted water nozzle
5b Nozzle
6, 7 Bag-in-box
8 Cleaning filter
9 Carbon dioxide gas cylinder
10 Syrup tank
11, 12, 14, 15, 16 Blade tube
13 Gas regulator
20 Control section
2.1 Storage section
23 Water solenoid valve
24 Carbonated water solenoid valve
25 Syrup solenoid valve
26, 27 BIB tube pump
28 Table
29 Dilution ratio data
30 Control data
31 Total capacity data
32 Freshness date data
33 Container capacity data
41 Brand name information
42, 43 Remaining amount ratio information
44 Total capacity information
45 Freshness date information
46 Current remaining amount information
47 Estimated remaining sales amount information
50, 51 Syrup nozzle
52 Carbonated water nozzle
100 Beverage supplying apparatus

The invention claimed is:

1. A beverage supplying apparatus that supplies a beverage in which a syrup and at least one of diluent water and carbonated water are mixed, the apparatus comprising:
a control section that causes a beverage selected from among a plurality of types of beverages to be discharged from a predetermined nozzle; and
a storage section that stores data indicating a dilution ratio for each beverage, a remaining amount for each syrup and a supply amount of each beverage per container, wherein:
the control section calculates a discharge amount per container of a syrup used to produce the selected beverage, based on data indicating the dilution ratio of the selected beverage and the data indicating the supply amount of the selected beverage per container,
the control section calculates a current remaining amount of the syrup every time the selected beverage is produced, by detecting an amount of the syrup discharged from the predetermined nozzle and subtracting the discharged amount of the syrup from the remaining amount of the syrup, and
the control section calculates a sellable amount of the selected beverage based on the current remaining amount of the syrup and the discharge amount per container of the syrup used to produce the selected beverage, and displays the sellable amount on a screen,
wherein the control section calculates a syrup discharge amount from equation (1) and an estimated remaining sales amount from equation (2), $$v2 = v1 \times r2/(r1+r2) \qquad \text{[Equation 1]}$$

$$E = v3/v2 \qquad \text{[Equation 2]}$$

where v1 is a container capacity, v2 is the syrup discharge amount, v3 is the current remaining amount, r1 is a volume of diluted water, r2 is a volume of main syrup, and E is the estimated remaining sales amount.

2. The beverage supplying apparatus according to claim 1, wherein the control section calculates a period until the selected beverage is sold out, based on an amount of sales per unit period of the selected beverage and the sellable amount, and displays on a screen, the period until the selected beverage is sold out.

3. The beverage supplying apparatus according to claim 2, wherein the control section calculates an estimated selling out date of the selected beverage based on the period until the selected beverage is sold out, and displays warning information on a screen when the estimated selling out date exceeds a freshness date of the syrup used to produce the selected beverage.

4. A beverage supplying apparatus comprising:
a control section that calculates:
a current remaining amount of a syrup used to produce a selected beverage every time the selected beverage is produced, by detecting an amount of the syrup discharged from a nozzle and subtracting the discharged amount of the syrup from a remaining amount of the syrup, and
a sellable amount of the selected beverage based on the current remaining amount of the syrup and a discharge amount per container of the syrup used to produce the selected beverage; and
a notifier that notifies a user of the sellable amount of the selected beverage,
wherein the control section calculates a syrup discharge amount from equation (1) and an estimated remaining sales amount from equation (2), $$v2 = v1 \times r2/(r1+r2) \qquad \text{[Equation 1]}$$

$$E = v3/v2 \qquad \text{[Equation 2]}$$

where v1 is a container capacity, v2 is the syrup discharge amount, v3 is the current remaining amount, r1 is a volume of diluted water, r2 is a volume of main syrup, and E is the estimated remaining sales amount.

5. The beverage supplying apparatus according to claim 4, wherein:
the control section calculates a period until the selected beverage is sold out, based on an amount of sales per unit period of the selected beverage and the sellable amount, and
the notifier notifies the user of the period until the selected beverage is sold out.

6. The beverage supplying apparatus according to claim 5, wherein:
the control section calculates an estimated selling out date of the selected beverage based on the period until the selected beverage is sold out, and
the notifier notifies a user of warning information when the estimated selling out date exceeds a freshness date of the syrup used to produce the selected beverage.

* * * * *